United States Patent [19]

Parker

[11] 4,247,664
[45] Jan. 27, 1981

[54] POLYMERIC ALKYLATED 1,2 DIHYDROQUINOLINES

[75] Inventor: Richard G. Parker, Hudson, Ohio

[73] Assignee: The B. F. Goodrich Company, Akron, Ohio

[21] Appl. No.: 947,784

[22] Filed: Oct. 2, 1978

[51] Int. Cl.$^3$ .............................. C08F 126/06
[52] U.S. Cl. .................... 525/334; 546/166; 525/375; 525/241; 260/4 AR
[58] Field of Search .............. 546/166; 260/45.8 NW; 525/334

[56] References Cited

PUBLICATIONS

Fieser et al., "Adv. Organic Chemistry", p. 635, Reinhard, New York, N. Y., 1961.

Primary Examiner—Donald G. Daus
Assistant Examiner—D. B. Springer
Attorney, Agent, or Firm—James R. Lindsay

[57] ABSTRACT

Novel compounds formed by alkylating a polyvinyl aromatic resin with a substituted 1,2-dihydroquinoline (hereafter "TMDQ" for brevity), are found to be powerful stabilizers for organic materials subject to oxygen and heat degradation. As antioxidants these compounds are essentially non-bleeding and non-staining in rubber and polyolefins. Compositions comprising from about 0.1 to about 10.0 parts by weight of the novel compounds per 100 parts organic material, are found to be essentially stable for extended periods of time under normal conditions of use.

A process for alkylating a polyvinyl aromatic resin with TMDQ necessarily utilizes at least a stoichiometric quantity, with respect to TMDQ, of an anhydrous Friedel-Crafts type acid-acting metal halide catalyst in a solvent for the resin. The reaction is carried out at an elevated temperature preferably at about the boiling point of the solvent. Preselected ratios of TMDQ to the number of monomeric vinyl aromatic moieties in the resin, yield an alkylated reaction product with predetermined ratios of TMDQ moieties to polystyrene moieties.

2 Claims, No Drawings

POLYMERIC ALKYLATED 1,2 DIHYDROQUINOLINES

BACKGROUND OF THE INVENTION

Any material, whether natural or synthetic must exhibit satisfactory resistance to degradation under conditions of use, if products made from the materials are to find a lasting market. A lack of satisfactory resistance to degradation usually manifests itself as a partial or total loss of structural integrity, a darkening or discoloration of the product, a loss of flexibility or resilience, or a combination of the above phenomena. These phenonmena are promoted or catalyzed by air (oxygen), heat and light, and are particularly susceptible to autooxidation at elevated temperatures in the presence of oxygen.

To protect organic materials, ingredients which can be collectively called stabilizers are admixed with the materials to prevent or inhibit degradation. These stabilizers work in diverse and complex ways, such that a compound which stabilizes against oxygen degradation in one type of material may be relatively inactive in another type of material. Thus compounds which are stabilizers are further classed as antioxidants, antiozonants, heat stabilizers and ultraviolet (UV) light stabilizers, depending upon what type of activity and stabilization they best demonstrate. In many cases, to obtain optimum protection, a mixture of compounds, each specifically selected to afford maximum protection against a certain type of degradation, is often used. In some instances stabilizers are deliberately chosen to counter the adverse effects of a plasticizer which, though highly effective as a plasticizer, tends to accelerate oxygen and heat degradation. In other words, the unplasticized material is more susceptible to degradation than if no plasticizer was added. As a general empirical rule, it is found that plasticizers are marginally effective as stabilizers, and stabilizers are marginally effective as plasticizers, it being more likely that a compound with desirable stabilizer properties has undersirable plasticizer properties, and vice versa.

The stabilization of rubber, and particularly synthetic "natural rubber", is essential for its proper functioning and long life. Although most antioxidants give good protection as stabilizers, not all stabilizers give satisfactory antioxidant activity (Encyclopedia of Polymer Science and Technology, Vol. 12, btm p 267, Interscience Publishers, New York, 1970). The compounds of this invention are primarily antioxidants though they exhibit other desirable stabilizing properties. They are particularly useful in synthetic natural rubber (SNR), specifically to prevent the staining of whitewall tires on passenger car tires. They are also particularly effective in injection-molded polypropylene articles such as the rotors of washing machines, synthetic resinous floor mats for automobiles, hose for oil coolers, fuel hoses, hydraulic brake lines, and vividly pigmented garden hose. The compounds are mainly used as a primary antioxidant, i.e. as the sole antioxidant, but if desired, may be combined with a secondary antioxidant which serves to enhance the stabilizing performance of the primary antioxidant. When used in combination with a secondary antioxidant, the stabilizing effect achieved is sometimes synergistic and the performance of the combination substantially exceeds the sum total of the performances exhibited by the individual antioxidant components.

The time-tested rubber antioxidants chemically classed as amines and phenols and their respective derivatives are still being used, but newer antioxidants combine a hindered phenol group with another group containing sulfides, triazine, phosphates, phosphites, etc. with the expectation that the active material produced will combine the advantages of its two or more component stabilizing moieties.

The compounds of this invention do not belong to any well-recognized chemical class of antioxidants. They are polymers having a vinyl aromatic backbone to which is attached at least one alkyl substituted 1,2-dihydroquinoline moiety.

As is well-known to those skilled in the art, the effectiveness of an antioxidant is predicated upon the oxidizable material in which the antioxidant is used. Thus, though antioxidants are used in plastics, elastomers, petroleum products, synthetic lubricants, food products, paints, soaps and cosmetics, it is seldom that the same type of antioxidant will be useful in a plastic or elastomer, and a petroleum or synthetic lubricant. Yet the compounds of this invention provide just such a multifunctional purpose, being useful in several synthetic resinous materials including plastics, elastomers and particularly conjugated diene polymers.

Though a wide variety of antioxidants is effective in a white-wall of a tire, each has certain shortcomings. For example, Age Rite Resin D*, a polymerized 2,2,4-trimethyl-1,2-dihydroquinoline (hereinafter "polyTMDQ" for brevity), commercially available from R. T. Vanderbilt Co. (see Encylcopedia of Polymer Science and Technology, Vol. 2, p 190, published by Interscience Publishers, John Wiley & Sons, Inc. 1965), has a tendency to stain the white-wall of a vehicle's tire. Unless one makes and sells white-walled tires, this consideration is of minor importance. Nonetheless, it should not be surprising that an excellent antioxidant should fall a little short with respect to one or more of the eight basic attributes of a quintessential antioxidant (see id., supra, p 185). Since there are known antioxidants notably less prone to stain white-walls, it is of especial interest that I have passed over these known antioxidants as a starting point for the production of non-staining antioxidants, in favor of TMDQ which is known to stain. It is of even greater interest that combining a vinyl aromatic resin, which by itself is devoid of any stabilizing effects in rubber, with TMDQ, should result in a nonstaining stabilizer. In this regard it is to be noted that the alkylation of benzene or monomeric styrene with TMDQ yields a reaction product which has no measurable stabilizing effect in polypropylene.
*U.S. Trademark Since there are no guidelines, and certainly no rules for tailoring an antioxidant to be non-staining, one considering the possibilities of a likely combination of an aromatic moiety with a bicyclo moiety is not impelled to choose an alkylation reaction because these moieties are known to be difficult to alkylate. It is also difficult to choose any one of a class of alkylation catalysts from among the classes of alkylation catalysts, each of which catalysts may have a wide range of effectiveness in a particular reaction. Moreover it is known that one cannot predict the effectiveness of acid-acting Friedel-Crafts catalysts for alkylation reactions, much less the effectiveness of a specific Friedel-Crafts catalyst, in a particular, desirable alkylation reaction. It is even less likely that one can predict the alkylation of a polyvinyl aromatic resin with a substituted 1,2-dihydroquinoline, assuming one was desirous of doing so.

Now, it has long been known to use certain vinyl aromatic monomers in a reaction mixture in which a condensation of a bisphenol, such as 2,2-bis(4-hydroxyphenyl)propane, with an olefin yields an alkylated bisphenol (see U.S. Pat. No. 3,022,269 to Jansen, Jacob E. and Kehe, Henry J.). The purpose of introducing from about 5 to about 25 parts of styrene to 100 parts of isobutylene into the alkylated reaction product was to overcome a tendency towards crystallization of the product.

It has been known for even longer (see U.S. Pat. No. 2,400,500 to Gibbs, Carlin F.), that alkyl-substituted, 1,2-dihydroquinolines may be condensed with diarylamines in the presence of catalysts of the Friedel-Crafts type, so that the diarylamine adds to the double bond of the dihydroquinoline to form a substituted tetrahydroquinoline which is a good antioxidant. But a diarylamine has very little in common with a polyvinyl aromatic resin such as polystyrene, a dissimilarity emphasized by the fact that the reaction of TMDQ with a diarylamine proceeds relatively easily with any Friedel-Crafts type catalyst, while the reaction of TMDQ with polystyrene (say) proceeds only with at least a stoichiometric amount of a metal halide Friedel-Crafts type catalyst in the presence of a suitable solvent for the polymer.

From the foregoing and numerous other references, it will now be evident that in the far-flung classification of stabilizers which are unpredictable as to the desirable effects of certain moieties and their off-setting drawbacks, there is no reason to expect that a polystyrene moiety, which itself has no desirable antioxidant properties whatsoever, should inculcate any desirable attributes to an antioxidant, least of all, any non-blooming and non-staining attributes. Further, I know of no basis upon which to predicate the alkylation of polyvinyl aromatic resin with any substituted 1,2-dihydroquinoline, nor any reason to expect that if such an alkylated reaction product were made, there would enure to it excellent antioxidant properties combined with an outstanding (a) lack of bloom to the surface, and (b) a disinclination to stain substances with which it comes into contact.

SUMMARY OF THE INVENTION

It has been discovered that a polymerized vinyl aromatic ("aralkenyl" for brevity) monomer such as polystyrene may be alkylated with a substituted -1,2-dihydroquinoline (hereinafter referred to as "TMDQ" for brevity), using an anhydrous acid-acting Friedel-Crafts type catalyst, in the presence of a Friedel-Crafts solvent for the polymer.

It has more specifically been discovered that a preselected number of TMDQ moieties in the range from 1 per monomeric aralkenyl moiety, to about 1 for 20 monomeric aralkenyl moieties, may be attached to a polyvinyl aromatic polymer backbone by an alkylation reaction to yield an alkylated polyvinyl aromatic compound (hereafter "polyvinyl aromatic-TMDQ," for brevity) having the structural formula:

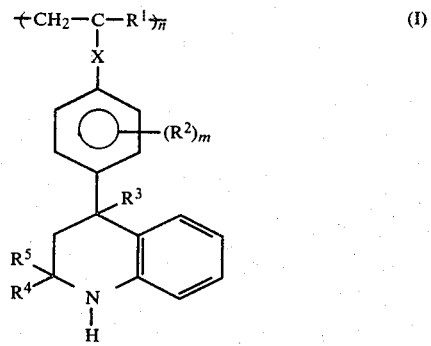

wherein,
n is an integer in the range from 1 to about 20,
X is alkylene having from 0 to about 5 carbon atoms,
$R^1$ or $R^3$ is hydrogen or alkyl having from 1 to about 20 carbon atoms,
$R^2$ is a substitutent on any but the para position, said substituent being selected from hydrogen and lower alkyl having from 1 to about 5 carbon atoms,
m is an integer in the range from 0 to 4, and
$R^4$ or $R^5$ is alkyl having from 1 to about 20 carbon atoms.

It has still more specifically been discovered that, despite the relatively low nitrogen content of the compounds of this invention, they are excellent stabilizers, comparable with commercial amine stabilizers of relatively high nitrogen content. Compounds of this invention having n=2 to about 10, and m=0 to 3 are especially useful as stabilizers in white vulcanizable rubbers which are remarkably non-staining. In this reaction it is necessary that at least one equivalent of an anhydrous metal halide catalyst be used for each equivalent of TMDQ, and that the vinyl aromatic polymer be dissolved in a solvent which is essentially inert with respect to the catalyst. Optionally, the catalyst may be promoted with a hydrogen halide gas corresponding to the halide catalyst used.

The polyvinyl aromatic-TMDQ compounds of this invention are useful stabilizers for a wide variety of organic materials. These stabilizers are generally amorphous powders when pure, possess low volatility, show excellent compatibility with most organic materials, are essentially non-staining and non-bleeding, and are desirably effective protective agents, most specifically as antioxidants. They serve to protect organic polymeric materials, both natural and synthetic, against the deleterious effects of oxygen, and heat. They are especially useful as antioxidants for natural and synthetic natural rubber (SNR), particularly in demanding applications such as white-wall tires. Typically, a white-wall is provided by bonding a white-wall strip to the wall of a tire. The strip includes a black sidewall "substrip" to which is bonded a "white strip." If plural white stripes are desired, an additional non-staining veneer strip is bonded to the white-wall which is thus sandwiched between the substrip and the veneer strip. One or more annular zones of rubber from the veneer strip are then abraded away or "buffed out," to expose the desired plural stripes. The plural stripes so provided on a sidewall are also referred to as a white-wall. If a single narrow or broad white stripe is desired, it is unnecessary to provide a veneer strip. Each component strip of a white-wall is preferably prevented from deterioration due to the effects of heat and/or light and/or oxygen or ozone by incorporating in the component a stabilizing amount of the polyvinyl aromatic-TMDQ compound of this invention. In so doing, the discoloration of the white-wall is avoided. Such discoloration is typically characteristic of a white-wall containing a stabilizer having a proclivity to stain because it bleeds out of the base substrip or the veneer strip of the white-wall. The compounds of this invention are also useful as antioxidants in homopolymers and copolymers, of alpha-monoolefins, particularly polyethylene, polypropylene, ethylene-propylene copolymer, and ethylene-propylene terpolymers.

DETAILED DESCRIPTION OF PREFERRED EMBODIMENTS

The stabilizer of this invention is desirably prepared by first blocking the proton which is associated with the N atom of 2,2,4-trimethyl-1,2-dihydroquinoline (TMDQ), and reacting the blocked TMDQ with a vinyl aromatic polymer which has been dissolved in a solvent for the polymer. An alkylation reaction proceeds readily in the presence of at least one equivalent of an anhydrous acid metal halide Friedel-Crafts catalyst per mol of TMDQ and preferably in the presence of up to about 20 mol percent excess. Most preferred is an excess of about 10 mol percent, but the amount of the excess required is not critical. There is no economic justification for using a larger excess than necessary to give acceptable results.

Among the substituted 1,2-dihydroquinolines which may be used to prepare the compounds of this invention, are 2,2,4-trimethyl 1,2-dihydroquinoline; 2-methyl-2,4-diethyl 1,2-dihydroquinoline; 2,2,4,6-tetramethyl 1,2-dihydroquinoline; 2,2,4,7-tetramethyl 1,2-dihydroquinoline; 6,6'-bis(2,2,3-trimethyl-1,2-dihydroquinoline), and the like. Other substituent groups such as alkoxy, aryl, nitro, etc., may also be present in the 1,2-dihydroquinoline, as for example 2,2,4-trimethyl-6-phenyl-1,2-dihydroquinoline, and the like. The reaction products of acetone with aminoindans, which are 1,2-dihydroquinolines may also be used. These compounds may be prepared, as is well-known, by reacting an aliphatic ketone or aldehyde with a primary aromatic amine. Such a process is described by Craig, U.S. Pat. No. 2,095,126, issued Oct. 5, 1937.

The critical necessity of at least one equivalent of anhydrous $AlCl_3$ per mol of TMDQ is of particular interest in view of the well-known fact that, where $AlCl_3$ is used in an alkylation reaction, the reaction typically requires "only a catalytic amount of aluminum chloride, formation of a complex mixture, and ready isolation from such a mixture . . ." (see Fieser, L. F. and Fieser, M., *Reagents for Organic Synthesis*, Vol. I p. 76, John Wiley & Sons, Inc. 1967). There is no indication that essentially all of an alkyl-substituted reactant should be complexed. In other words, a typical Friedel-Crafts reaction utilizing $AlCl_3$ does not use $AlCl_3$ as a reactant to complex essentially all of one of the reactants, and in addition, also to provide an excess of $AlCl_3$ to function as a catalyst. Reference to the use of $AlCl_3$ in the preparation of the compound of this invention as a "catalyst" is made, keeping in mind that $AlCl_3$ acts both as a complexing agent as well as a catalyst.

TMDQ is desirably blocked with an acidic blocking agent such as hydrochloric acid, or a lower carboxylic acid having from 2 to about 6 carbon atoms, by dissolving the TMDQ in a solvent for it. A suitable solvent for TMDQ is a lower primary alsohol having from 1 to about 5 carbon atoms, such as methanol. To the alcoholic solution of TMDQ is added one mol of concentrated hydrochloric acid per mol of TMDQ dissolved, so as to form TMDQ hydrochloride. It will presently be evident that blocking the proton associated with the N atom of TMDQ is essential if reaction of TMDQ with the vinyl aromatic polymer through the aforesaid proton is to be prevented.

It will also presently be evident that the acidic blocking agent on the proton must eventually be removed to restore the proton so that the well-known stabilization effect of the —NH— group may be exerted.

The vinyl aromatic polymer is a polyolefin preferably selected from the group consisting of copolymers and homopolymers of an aralkenyl compound in which the para position is not substituted. More preferred aralkenyl compounds are phenylalkenyl compounds having the formula

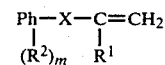

wherein
Ph is phenyl;
X is an alkylene radical containing from 0 to about 5 carbon atoms;
$R^1$ is hydrogen or an alkyl group having from 1 to about 20 carbon atoms;
$R^2$ is a substitutent on any but the para position, which substituent is hydrogen, lower alkoxy having from 1 to about 6 carbon atoms, or an alkyl radical having from 1 to about 20 carbon atoms; and,
m is an integer in the range from 0 to 4, preferably 0 to about 3. Specific phenylaralkenyl compounds are styrene, alpha-methyl styrene, m-methyl styrene, m-methyl alpha-methyl styrene, ethyl styrene, lower alkoxy styrenes having from 1 to about 6 carbon atoms such as m-methoxy styrene, allyl benzene, allyl naphthalene, and vinyl naphthalene. Most preferred is polystyrene. The molecular weight of the polyolefin is not critical and any conventional polymer may be used. Usable commercially available polymers range in molecular weight from about 1000 to about 500,000, with those in the range from about 50,000 to about 100,000 being most preferred.

The solvent for the vinyl aromatic polymer is not critical provided the solvent is essentially inert, particularly with respect to the Friedel-Crafts catalyst, under the conditions of reaction. Suitable solvents are the aromatic and chlorinated hydrocarbons (e.g. toluene, perchloroethylene, chloroform, trichlorobenzene, carbon tetrachloride, ethylene dichloride, and the like), carbon disulfide, tetralin, dioxan, methyl ethyl ketone, pyridine, cyclohexanone, and ethyl acetetate.

The reaction is carried out in the presence of an acidic condensation catalyst, for example, a catalyst of the Friedel-Crafts type. Most of the Friedel-Crafts type catalysts which are strong acids, or which produce acids upon hydrolysis or upon contact with organic materials, are surprisingly ineffective. Only anhydrous $AlCl_3$ gives acceptable results, and only when present in at least an equimolar amount relative to TMDQ. Although the precise chemical structure of the new compound, formed by the alkylation reaction, is not known, it is believed that the TMDQ adds to the polyvinyl aromatic resin backbone through an alkyl group of the substituted tetrahydroquinoline.

The reaction can usually be carried out at a temperature of from about room temperature to about 200° C. or above, and at either subatmospheric, atmospheric or elevated pressure, depending upon the reagents used. As already stated, the relative proportions of AlCl$_3$ and TMDQ is critical, but the ratio of TMDQ to monomeric vinyl aromatic moieties may vary widely, ranging from about an equimolar amount, that is 1 mol TMDQ per monomeric aralkenyl moiety, to about 1 mol TMDQ per 20 monomeric aralkenyl moieties. Most desirable stabilization is generally obtained when the ratio of TMDQ to monomeric aralkenyl moieties ranges from about 1:2 to about 1:10.

The condensation reaction is conveniently carried out in an autoclave equipped with a stirrer, heater, a reflux condenser and inlet tubes for introducing the reactants into the bottom of the autoclave. The reaction is preferably conducted under an inert atmosphere such as nitrogen. A solvent such as ethylene dichloride (EDC) is placed in the autoclave, a predetermined amount of polystyrene is dissolved in it, and TMDQ hydrochloride is added thereto. About 1.1 mols of anhydrous AlCl$_3$ are gradually added to the contents of the autoclave while stirring vigorously and heating to a temperature of about 70° C., or below the boiling point of the solvent used. When all the AlCl$_3$ is added, the temperature is raised to reflux temperature while stirring is continued. At the end of the reaction, which is generally complete in about an hour, the reaction mixture is allowed to cool overnight to room temperature. The hydrochloric acid, or other acidic blocking agent, is neutralized with an alkali such as sodium hydroxide, and the EDC layer separated and dried. A powder is obtained which is dissolved in acetone and precipitated by pouring the acetone solution into methanol. The precipitate is filtered and dried.

The reaction products of this invention are non-staining, non-discoloring, highly efficient, oxygen-resisting deterioration retarders, for rubbers which undergo deterioration on exposure to the atmosphere, and especially for sulfur-vulcanizable diolefinic polymers which include all natural rubbers and all vulcanizable synthetic rubbery diolefinic polymers, both unvulcanized and vulcanized. The term "vulcanizable rubbery diolefinic polymer" is employed in the specification and claims hereof to embrace (a) polymers of isoprene, which include the natural rubbers, and polymers of conjugated diolefins including butadiene-1,3, dimethyl butadiene, chlorobutadiene, fluorobutadiene, cyanobutadiene and similar conjugated diolefins; (b) copolymers of these conjugated diolefins with each other; and (c) copolymers of these conjugated diolefins with other unsaturated compounds copolymerizable therewith including monoolefins such as the vinylidene compounds represented by the styrenes, acrylonitriles, acrylic and methacrylic acid and their esters, isobutylene, vinylidene chloride, vinyl pyridine, vinyl esters, vinyl alkyl esters and the like. The method of preparation of the above enumerated rubbery diolefinic polymers is immaterial and the alkylated polyvinyl aromatic compounds of this invention may be added to a solution, latex or dry polymer product as is well-known to those skilled in the art. The alkylated polyvinyl aromatic resin may be added as is, or in a solution, emulsion, dispersion or the like.

In general, the stabilizers of this invention are employed in the range from about 0.1% to about 20% by weight of the stabilized composition, the particular amount used depending upon the organic material in which the stabilizer is used. A preferred range for use in a natural or synthetic rubber, such as is used for automobile tires, is in the range from about 1% to about 10%, it being most preferred to use about 5% by weight, or as little as is required to give the desired stabilization without staining a white wall. The compound of this invention is economically most advantageously used in the substrip, white rubber strip and superstrip (if used) of a white-wall strip laminate which is to be bonded to an exterior wall of a tire.

The stabilizer of this invention is mixed into rubber stocks in any conventional manner. It is readily incorporated into the rubber prior to vulcanization by mixing on a rubber mill or in an internal mixer, such as a Banbury; added to solutions or dispersions of the polymer; added as is, in solvents, in dispersions, masterbatched with other compounding ingredients and the like. The stabilizer may be used in rubber compounds with any of the conventional processing aids and oils, fillers, reinforcing agents, extenders, curing agents, accelerators, antioxidants, antiozonants, and the like. It is compatible with known antioxidants and antiozonants which may be used for economic reasons, and in combination with certain of these shows synergistic activity, though it is generally preferred to use the compounds of this invention as the sole stabilizer.

Antioxidants which may be used in conjunction with compounds of this invention include derivatives or homologs of hydroquinone such as the monobenzyl ether of hydroquinone or 2,5-di-tert-butyl-hydroquinone; substituted phenols such as styrenated phenols; disubstituted cresols such as 2,6-di-tert-butyl-p-cresol; bis-phenols as 2,2'-methylenebis(4-methyl-6-tert-butylphenol) and 4,4'-methylenebis(2,6-di-tert-butylphenol); bisthiophenols as thiobis (di-sec-amylphenol) and 4,4'-thiobis(6-tert-butyl-o-cresol); catechol derivatives as di-o-tolylguanidine salt of dipyrocatechol borate; naphthol derivatives as 1,1'-methylenebis-2-naphthol; butylated 4,4'-isopropylidenediphenol; aminophenols as N-lauroyl p-aminophenols; primary polyamines as p,p'-diaminodiphenylmethane; diarylamines as N-phenyl-alpha-naphthylamine, N-phenyl-beta-naphthylamine and p-isopropoxydiphenylamine; bisdiarylamines as N,N'-diphenyl-p-phenylenediamine, N,N'-di-beta-naphthyl-p-phenylenediamine; diarylamines as N-phenyl-alpha-naphtylamine and 2,4-diaminotoluene, N,N'-diphenylethylenediamine and N,N'-diphenyl p-phenylenediamine; bisdiarylamines as N-cyclohexyl-N'-phenyl-p-phenylenediamine; alkylated diarylamines as monooctyl- and dioctyldiphenylamine; mixtures containing alkylated diarylamines as mixtures of octyldiphenylamines and wax; ketonediarylamine condensation products as diphenylamine-acetone condensation products; dihydroquinolines as 1,2-dihydro-2,2,4-trimethyl-6-phenylquinoline; mixtures of dihydroquinolines and diarylamines as mixtures of polymerized 1,2-dihydro-2,2,4-trimethylquinoline and N,N'-diphenyl-p-phenylenediamine; aldehydesamine condensation products as aldol-alpha-naphthylamine condensation products; butyraldehyde-aniline condensation products; alkylarylamines as N,N'-diphenylethylenediamine; aldehyde imines as N,N'-disalicylalethylenediamine; alkyl aryl phosphites, dithiocarbamates, thiazyl derivatives, thiuram disulfides; thiodipropionates and the like.

The following examples are given to illustrate the invention in further detail. Also, procedures are set forth for the preparation of compositions containing a compound of this invention, and for the testing of the efficacy of the compound as a stabilizer which does not stain a white wall of a tire. All parts referred to are parts by weight, unless specifically referred to otherwise.

EXAMPLE 1

10.49 parts 2,2,4-trimethyl-1,2-dihyroquinoline (TMDQ) are dissolved in methanol and an equimolar amount of conc HCl is added to the solution. The TMDQ hydrochloride so formed is recovered by filtration of crystals solution. These crystals may similarly be recovered from any other solvent in which TMDQ is soluble. Such solvents include other lower primary alcohols, ketones and water.

104.14 parts of polystyrene commercially available as Dow Styron* 678U in the form of a powder having a melt index of about 11, and a molecular weight of about 100,000, are dissolved in sufficient ethylene dichloride (EDC) to form about a 10 wt % solution which is charged to a flask fitted with a stirrer, condenser, thermometer and $N_2$ sweep. Other Styron* resins such as 475U and 402D having melt indices in the range from about 2 to about 14 may also be used, but those in the range from about 7 to about 13 are preferred. 13.34 parts anhydrous $AlCl_3$ are added to the EDC solution, this amount corresponding to slightly more than one equivalent of TMDQ. The TMDQ hydrochloride crystals are then added to the EDC solution and heated to reflux temperature for about an hour. The reaction mixture is then allowed to cool overnight to room temperature. The cooled solution is neutralized with alkali such as KOH or NaOH solution, and the neutralized mixture is allowed to stratify. The EDC layer is separated and dried in any conventional manner, preferably by roto-evaporation. The product is further purified by dissolving in acetone and precipitating by dumping the acetone solution into methanol. The solid recovered, when dried, yields a powdery, amorphous, light-colored solid. Analysis indicates that the alkylated polystyrene compound recovered has one TMDQ moiety for about every 10 monomeric styrene moieties (that is, n = 10 in structural formula I). By changing the ratio of TMDQ hydrochloride added to the solution of styrene in EDC, other compounds are prepared having as little as 1 TMDQ moiety for about every 20 monomeric styrene moieties, and as much as 1 TMDQ moiety for each monomeric styrene moiety.

*U.S. Trademark

In a manner analogous with that described immediately hereinabove, alpha-methyl styrene, p-methyl styrene, p-methyl alpha-methyl styrene, and ethyl styrene are alkylated with predetermined amounts of TMDQ, or substituted TMDQ is yield useful stabilizers.

A compound of this invention was tested in an oil-extended SBR compound typical of the type used for white-wall strips bonded to passenger car tires. The recipe for the strip composition was as follows:

| Component | Parts by wt |
| --- | --- |
| Oil extended SBR | 125. |
| Zinc oxide | 5. |
| Stearic acid | 1. |
| Carbon Black | 63. |
| Sulfur | 2. |

-continued

| Component | Parts by wt |
| --- | --- |
| Compound of Example 1 | 10. |

The oil-extended SBR used contained 25 parts per hundred rubber (phr) aromatic processing oil, had a specific gravity of 0.95, a ML4' at 212° F. = 50–65 and the rubber had a bound styrene content of 23.5%.

The stabilizer obtained in Example 1 is tested for staining and discoloring tendencies by incorporating the stabilizer into a standard white sidewall tire composition and curing in a standard steam testing press, to produce a white vulcanizate. The recipe employed is:

| Compounding recipe | Parts by wt |
| --- | --- |
| Natural rubber | 100.0 |
| Zinc oxide | 85.0 |
| Titanium oxide | 15.0 |
| Ultramarine Blue | 0.2 |
| Stearic acid | 1.0 |
| Hepteen base | 0.3 |
| Sulfur | 3.0 |
| Stabilizer from Example 1 | 10.0 |

A blank without stabilizer, and a control stock containing phenyl beta-naphthylamine as the typical conventional amine antioxidant, are also compounded for comparison purposes. The cured stocks are exposed to a standard RS sun lamp at a distance of 8 inches for 24 hours to determine discoloration in the stock. In the data table given below, the larger the numerical value of the rating, the greater the discoloration.

| Discoloration | |
| --- | --- |
| | Numerical Value |
| Blank | 2 |
| Stabilizer of Example 1 | 1 |
| Phenyl beta-naphthylamine control | 8 |

The stabilizer obtained in Example 1 is tested for staining by taking cured test pieces of the white vulcanizates obtained as described above and placing them between white lacquered and white enameled refrigerator panels for 96 hours at 80° C. at a contact pressure of 1 pound per square inch. In the data table given below, the larger the numerical value of the fractional rating, the greater the stain.

| Staining | |
| --- | --- |
| | Numerical Value |
| Blank | 0.2 |
| Stabilizer from Example 1 | 0.2 |
| Phenyl beta-naphthylamine control | 4.0 |

The smaller fractional rating of staining and discoloration in the stock containing the reaction product of the example clearly shows the superiority of the alkylated polystyrene of this invention over the standard control antioxidant, phenyl beta-naphthylamine.

The stabilizer of Example 1 is tested for its efficacy as an antioxidant by compounding with natural rubber in the following recipe:

| Compounding recipe | Parts by wt |
|---|---|
| Natural rubber | 100.0 |
| Easy processing channel black | 50.0 |
| Zinc oxide | 5.0 |
| Stearic acid | 3.0 |
| Sulfur | 3.0 |
| Benzothiazyl disulfide | 1.0 |

Three compounded stocks are prepared: (1) a blank without any stabilizer or antioxidant, (2) a control stock with one part of phenyl betanaphthylamine (PBNA, for brevity) per hundred of rubber (phr), and (3) a stock containing one part of the alkylated vinyl aromatic polymer (referred to in the Tables hereafter as Stabilizer+) of Example 1, phr. All three stocks are identically cured in a steam press at 280° F. for 60 and 80 mins. Test dumbbell strips are cut from the vulcanized stocks and aged in air in open test tubes for 24 to 48 hrs at 212° F. Stress strain results are obtained on both the aged and unaged samples. This test is fully described in ASTM test method D865-48T. Other aged strips are subjected to flexing tests in a De Mattia Flexing Machine where the test strips are flexed and the number of flexures are recorded. The flex test is carried out until crack growth has reached a rating of 7, where a rating of 0 represents no cracking and a rating of 10 represents complete break. The ratings are determined by comparison of the crack growth with established standards for each rating. Elongation (Elong'n, for brevity) is conventionally measured and given as percent (%). The following test results are obtained:

TABLE 1
PROPERTIES OF VULCANIZED RUBBER BEFORE AGING

| Time of Cure mins | No Antioxidant | | Stabilizer+ | | PBNA | |
|---|---|---|---|---|---|---|
| | Tensile psi | Elong'n % | Tensile psi | Elong'n % | Tensile psi | Elong'n % |
| 60 | 4,010 | 510 | 4,280 | 530 | 4,260 | 510 |
| 80 | 3,180 | 440 | 3,490 | 490 | 3,440 | 500 |

TABLE 2
PROPERTIES AFTER AGING 24 HRS AT 212° F.; PERCENT TENSILE RETAINED

| Time of Cure mins | No Antioxidant % | Stabilizer+ % | PBNA % |
|---|---|---|---|
| 60 | 51 | 81 | 80 |
| 80 | 44 | 78 | 72 |

TABLE 3
FLEX-LIFE - DE MATTIA FLEXURES TO RATING OF 10

| | No Antioxidant | Stabilizer+ | PBNA |
|---|---|---|---|
| No. of flexures | 13,000 | 94,000 | 98,000 |
| Ratio to Blank | 1 | 7.25 | 7.52 |

The stabilization properties of the polyvinyl aromatic-TMDQ of this invention are shown in the above tabulations to be superior, or substantially equal, to PBNA which is one of the most widely used commercial antioxidants, with the added advantage that, unlike PBNA, the compounds of this invention are essentially non-discoloring and non-staining, which makes its use in white sidewall tires, refrigerator gaskets, light-colored gloves, bathing caps and similar articles, especially desirable.

I claim:

1. A compound of the formula

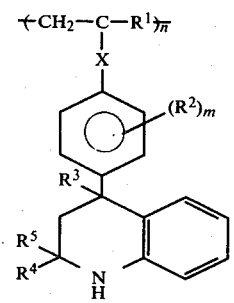

wherein,
n is an integer in the range from 1 to 20,
X is alkylene of from 1 to 5 carbon atoms, or a bond,
$R^1$ to $R^3$ is hydrogen or alkyl having from 1 to 20 carbon atoms,
$R^2$ is a substituent selected from hydrogen and lower alkyl having from 1 to 5 carbon atoms,
m is an integer in the range from 0 to 4, and
$R^4$ and $R^5$ is alkyl having from 1 to 20 carbon atoms and wherein the $R_1$–$R_5$ alkyl groups are non-sterically hindered and stable under the reaction conditions employed.

2. The compound of claim 1 wherein n is an integer in the range from 2 to 10, m is an integer in the range from 0 to 3, and X is a bond.